(12) United States Patent
Oliver et al.

(10) Patent No.: US 12,173,687 B1
(45) Date of Patent: Dec. 24, 2024

(54) SYSTEM AND METHOD FOR PERFORMING EXTERNAL AND INTERNAL INSPECTIONS OF WIND TURBINE BLADES

(71) Applicant: Renewable Energy Systems Americas Inc., Denver, CO (US)

(72) Inventors: Andrew George Oliver, Niwot, CO (US); Javier Canosa Louzán, a Coruña (ES); Alexander Devon Bamberger, Fort Collins, CO (US); Jack Noakes, Rattlesden (GB); José Antonio Riveiro Rodríguez, a Coruña (ES)

(73) Assignee: RES Digital Solutions Limited, Hertfordshire (GB)

( * ) Notice: Subject to any disclaimer, the term of this patent is extended or adjusted under 35 U.S.C. 154(b) by 0 days.

(21) Appl. No.: 18/399,404

(22) Filed: Dec. 28, 2023

(51) Int. Cl.
*F03D 17/00* (2016.01)
*G06T 7/00* (2017.01)

(52) U.S. Cl.
CPC ......... *F03D 17/028* (2023.08); *F03D 17/001* (2023.08); *F03D 17/003* (2023.08); *F03D 17/004* (2023.08); *F03D 17/013* (2023.08); *G06T 7/97* (2017.01); *G06T 2207/20212* (2013.01)

(58) Field of Classification Search
None
See application file for complete search history.

(56) References Cited

U.S. PATENT DOCUMENTS

| | | | |
|---|---|---|---|
| 9,581,165 B2 | 2/2017 | Babbitt et al. | |
| 11,106,208 B2 * | 8/2021 | Alshamrani | G06K 7/1417 |
| 2020/0325878 A1 * | 10/2020 | Danko | B08B 1/30 |
| 2021/0071647 A1 * | 3/2021 | Girolamo | H04N 23/54 |
| 2024/0078654 A1 * | 3/2024 | Miller | G06V 10/82 |

FOREIGN PATENT DOCUMENTS

ES 2796964 B2 11/2021

* cited by examiner

*Primary Examiner* — Leon Q Nguyen
(74) *Attorney, Agent, or Firm* — Dorsey & Whitney LLP

(57) ABSTRACT

Systems and methods for performing external inspections and internal inspections on wind turbine blades and correlating the external and internal inspections with one another are disclosed herein. A method of inspecting a wind turbine blade includes analyzing an exterior of the blade to produce external blade data, analyzing an interior of the blade to produce internal blade data, correlating a first position of the internal blade data with a second position of the external blade, and displaying an image including the first position and the second position.

20 Claims, 10 Drawing Sheets

SYSTEM AND METHOD FOR PERFORMING EXTERNAL AND INTERNAL INSPECTIONS OF WIND TURBINE BLADES

FIELD

The described embodiments relate generally wind turbines, and more particularly, to systems and methods for performing external and internal inspections on rotor blades of wind turbines and correlating the external and internal inspections.

BACKGROUND

Wind power is considered a clean, environmentally friendly renewable energy source, and wind turbines used to generate wind power have gained increased attention. Wind turbines include blades that rotate about a main axis to capture kinetic energy from the wind by converting mechanical energy to electrical energy through an electrical generator. The rotor blades are generally formed from composite materials, which are expensive to manufacture and can suffer catastrophic failures. These failures can lead to large expenditures and downtime for wind turbines. Thus, maintenance operations, such as inspections, are routinely performed on the rotor blades to ensure that they are undamaged and in optimal operating condition.

However, conventional inspections mostly focus on exterior surfaces or interior surfaces of rotor blades alone. This gives a partial picture of damage present on the rotor blades. For example, because the rotor blades are formed from composite materials with layered structures, it may be difficult to determine the extent of damage to the rotor blades based on inspections of exterior surfaces or interior surfaces alone. Accordingly, there is a need for systems and methods for performing more detailed inspections on the rotor blades to assess the full extent of any damage present on the rotor blades.

SUMMARY

In at least one example of the present disclosure, a method of inspecting a blade of a wind turbine includes analyzing an exterior of the blade to produce external blade data, analyzing an interior of the blade to produce internal blade data, correlating a first position in the internal blade data with a second position in the external blade data, and displaying an image including the first position and the second position.

In some examples, analyzing the exterior of the blade can include imaging the exterior of the blade. Analyzing the interior of the blade can include imaging the interior of the blade. Displaying the image can include displaying a first image of the interior of the blade including the first position and a second image of the exterior of the blade including the second position.

In some examples, a first device analyzes the exterior of the blade, a second device analyzes the interior of the blade, and the first position is correlated with the second position by detecting a position of the second device relative to the blade.

In some examples, the method can further include identifying a defect on the exterior or the interior of the blade. The first position and the second position can correspond to a position of the defect relative to the blade.

In some examples, the method can further include identifying a defect on the exterior or the interior of the blade and assessing a risk level corresponding to the defect based on a combination of the external blade data and the internal blade data. In some examples, the method can further include providing recommendations for at least one of monitoring the blade, inspecting the blade with a different technology, repairing the blade, replacing the blade, or altering a control parameter of the wind turbine in response to the assessed risk level.

In some examples, the method can further include stitching the external blade data together to form a panoramic view of the exterior of the blade and stitching the internal blade data together to form a panoramic view of the interior of the blade.

In some examples, a first device can analyze the interior of the blade. The first device can include a distance sensor. Analyzing the interior of the blade can include detecting interior dimensions of the blade using the distance sensor. The first position can be correlated with the second position by comparing detected interior dimensions of the blade with known dimensions of the blade.

In at least one example of the present disclosure, a system for performing an inspection of a blade of a wind turbine includes an external sensing device, an internal sensing device, and a display configured to display an image. The external sensing device is configured to analyze an exterior of the blade and produce an external data signal. The internal sensing device is configured to analyze an interior of the blade and produce an internal data signal. The image includes an exterior image generated from the external data signal, the exterior image including a first external position on the blade and an interior image generated from the internal data signal, the interior image including a first internal position on the blade corresponding to the first external position.

In some examples, the external sensing device can include a stationary sensor device or an unmanned aerial vehicle. In some examples, the internal sensing device can include an unmanned ground vehicle including wheels or tracks. In some examples, the internal sensing device can include a cable configured to spool and measure a distance traveled by the internal sensing device. In some examples, the internal sensing device can include at least one of an infrared sensor, a LiDAR sensor, an acoustic sensor, or an optical sensor.

In some examples, each of the exterior image and the interior image can include multiple images stitched together.

In at least one example of the present disclosure, a non-transitory computer-readable medium storing code for assessment of a wind turbine blade, the code including instructions executable by a processor to receive a first data stream corresponding to an external inspection of the wind turbine blade, receive a second data stream corresponding to an internal inspection of the wind turbine blade, detect a defect on the wind turbine blade based on the first data stream or the second data stream, and identify a first position in the first data stream corresponding to a position of the defect and a second position in the second data stream corresponding to the position of the defect.

In some examples, the code can further include instructions executable by the processor to display an image including the first position and the second position. In some examples, the code can further include instructions executable by the processor to assign a risk level to the wind turbine blade based on the defect detected on the wind turbine blade. In some examples, the code can further include instructions executable by the processor to provide recommendations for corrective actions to be performed on the wind turbine blade based on the defect detected on the wind turbine blade.

In some examples, the first data stream can include a plurality of images of an exterior of the wind turbine blade stitched together in a plurality of views. In some examples, the second data stream can include a plurality of images of a plurality of interior cavities of the wind turbine blade stitched together in a plurality of views.

Features from any of the above-mentioned examples may be used in combination with one another in accordance with the general principles described herein. These and other examples, features, and advantages will be more fully understood upon reading the following detailed description in conjunction with the accompanying drawings and claims.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
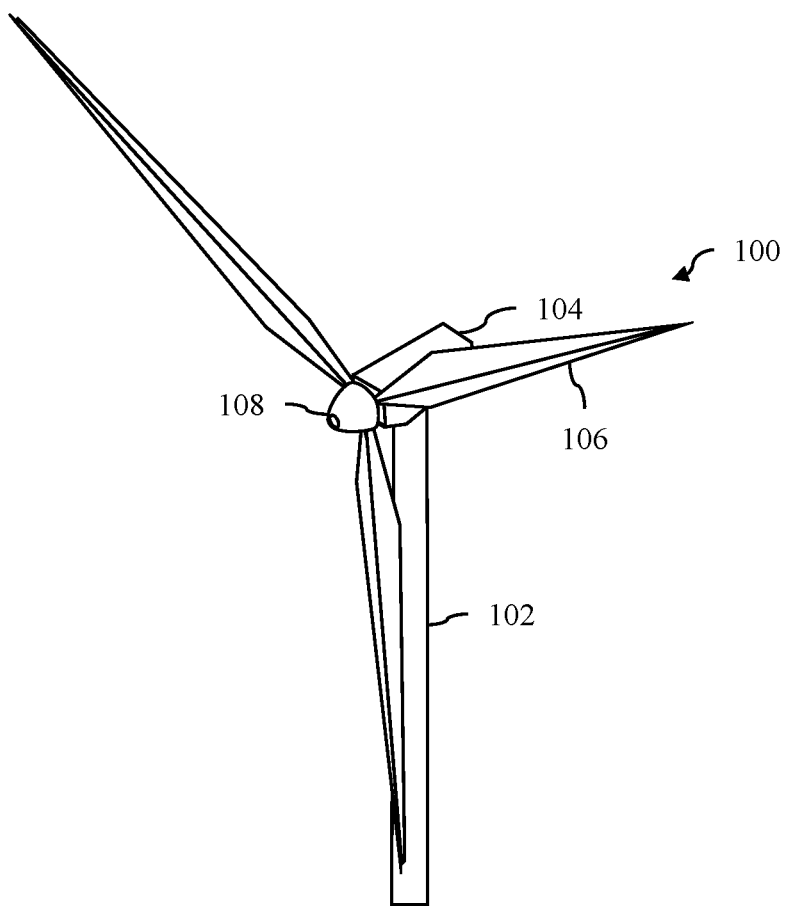
FIG. 1 shows a perspective view of a wind turbine.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to systems and methods for inspecting structures. More particularly, the present disclosure relates to systems and methods for inspecting rotor blades of wind turbines. The methods can include performing an external inspection on external surfaces of a rotor blade and generating external images of the rotor blade, performing an internal inspection on internal surfaces of the rotor blade and generating internal images of the rotor blade, and correlating positions on the internal images with positions on the external images. The external and internal inspections of the rotor blade can be performed in any desired order, and the correlating of positions can occur in real-time with the external and internal inspections, after the external and internal inspections, or in any desired order. The method can further include displaying the external images and the corresponding internal images together in order to provide a detailed view of any defects present on exterior and interior surfaces of the rotor blade. Based on the external and internal inspections, defects on the rotor blade can be assessed, risk levels can be associated with or assigned to the defects, and corrective actions to be taken can be suggested. This can provide improved data associated with any defects present on the rotor blade, which can be used to provide improved recommendations for corrective actions, thereby reducing repair and replacement costs of the rotor blades.

Various systems can be used to perform the methods of the present disclosure. In some examples, the external inspection can be performed by an external inspection device, such as a stationary sensing device, an unmanned aerial device, or the like. Positions on external images generated by the external inspection can be tracked by stitching the external images into a plurality of views and determining the positions relative to landmarks on the rotor blade, such as a blade tip, a blade root, internal structures of the blade, a leading edge, a trailing edge, a suction side, and a pressure side. The internal inspection can be performed by an internal inspection device, such as an unmanned ground device or the like. Positions on internal images generated by the internal inspection can be tracked by measuring a distance traveled by the internal inspection device, tracking a position of the internal inspection device in space as the internal inspection device performs the internal inspection, measuring distances between the internal inspection device and surfaces of the rotor blade as the internal inspection device performs the internal inspection, and the like. Based on the position tracking in the external images and the internal images, positions in the external inspection and the internal inspection can be correlated with one another. This correlation can provide improved information regarding the severity of any defects present on the rotor blade, which can be used to provide improved recommendations for corrective actions, thereby reducing repair and replacement costs of the rotor blades.

These and other embodiments are discussed below with reference to FIGS. 1-7. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a wind turbine 100. The wind turbine 100 includes a tower 102. A nacelle 104 is mounted on the tower 102. A plurality of rotor blades 106 are mounted to a rotor hub 108, which is connected to a main flange that turns a main rotor shaft. The main rotor shaft is connected to wind turbine power generation and control components housed within the nacelle 104, and power is generated through the main rotor shaft driving an electrical generator. Although three rotor blades 106 are illustrated in FIG. 1, the wind turbine 100 can include any number of rotor blades 106. The wind turbine 100 of FIG. 1 is generally provided for illustrative purposes only, and the present disclosure is not limited to any particular type of wind turbine configuration.

Figure 2A:
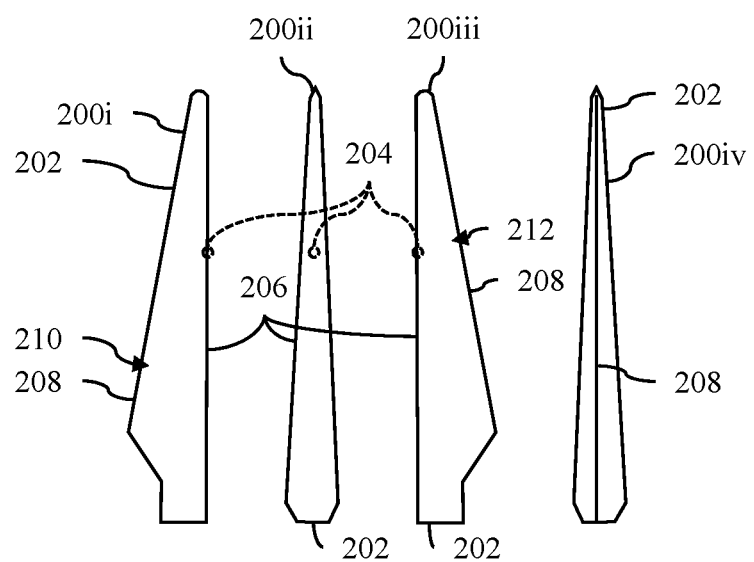
FIG. 2A shows multiple views of an exterior of a rotor blade of a wind turbine.
Figure 2C:
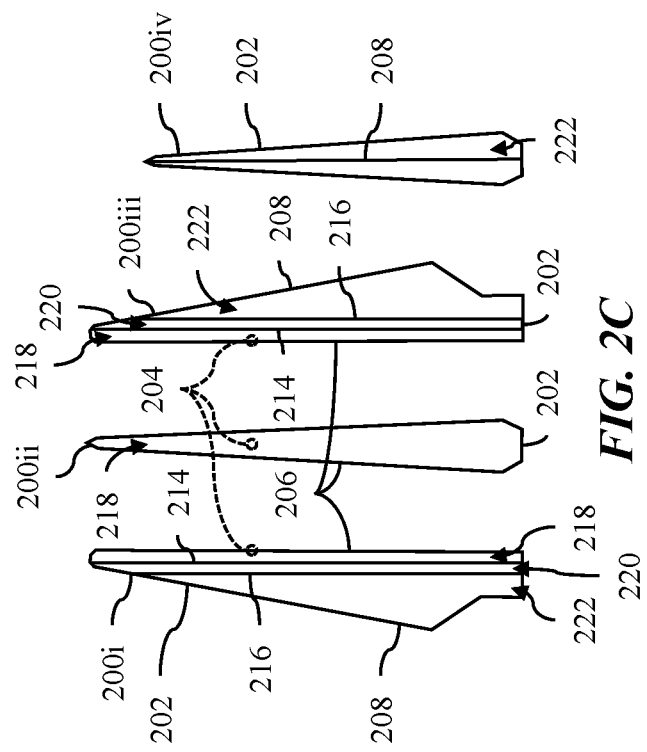
FIG. 2C shows multiple cross-sectional views of a rotor blade of a wind turbine.
Figure 2B:
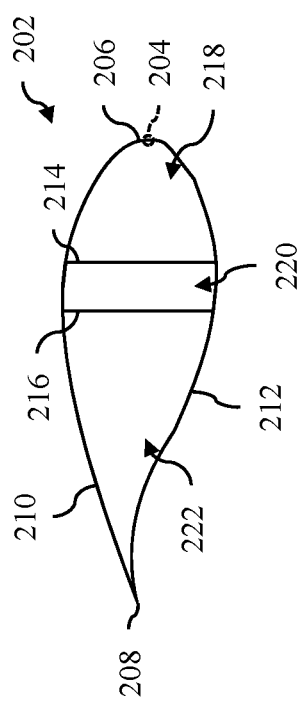
FIG. 2B shows a cross-sectional view of a rotor blade of a wind turbine.

FIGS. 2A through 2C illustrate various views 200i-200iv of a rotor blade 202 including a defect 204. FIG. 2A illustrates external views of the rotor blade 202. FIG. 2B illustrates a cross-sectional view of the rotor blade 202 in a plane perpendicular to a longitudinal axis of the rotor blade 202 (e.g., an internal view of the rotor blade 202). FIG. 2C illustrates cross-sectional views of the rotor blade 202 in planes parallel to the longitudinal axis of the rotor blade 202 (e.g., internal views of the rotor blade 202). The views 200i of FIGS. 2A and 2C illustrate the rotor blade 202 from a suction side of the rotor blade 202. The views 200ii of FIGS. 2A and 2C illustrate the rotor blade 202 from a leading edge side of the rotor blade 202. The views 200iii of FIGS. 2A and 2C illustrate the rotor blade 202 from a pressure side of the rotor blade 202. The views 200iv of FIGS. 2A and 2C illustrate the rotor blade 202 from a trailing edge side of the rotor blade 202.

The rotor blade 202 can be formed of various materials, such as composite materials. For example, the rotor blade 202 can have a layered structure including one or more layers of fiber materials (e.g., carbon fiber, fiberglass, aramid, or the like). The layers of the rotor blade 202 can be coated with resin materials (e.g., polyester, epoxy, or the like). The rotor blade 202 can be aerodynamically shaped to maximize rotation of the rotor blade 202 and energy generation as wind blows over the rotor blade 202. The rotor blade 202 can include a leading edge 206 and a trailing edge 208. A suction side 210 can extend between the leading edge 206 and the trailing edge 208 on one side of the rotor blade 202 and a pressure side 212 can extend between the leading edge 206 and the trailing edge 208 on the opposite side of the rotor blade 202. The rotor blade 202 can be oriented such that wind blows over the rotor blade 202 from the leading edge 206 to the trailing edge 208.

An exterior of the rotor blade 202 can be defined by a shell, which forms the leading edge 206, the trailing edge 208, the suction side 210, and the pressure side 212. In some examples, the rotor blade 202 can include an upper shell, which forms the suction side 210, and a lower shell, which forms the pressure side 212. The leading edge 206 and the trailing edge 208 can be formed at junctions of the upper shell and the lower shell. The rotor blade 202 can include various shear webs, spars, and spar caps, which provide the rotor blade 202 with desired strength and stiffness. In the example of FIGS. 2A through 2C, the rotor blade 202 includes two shear webs 214, 216. The shear webs 214, 216 can be connected to the shell of the rotor blade 202 through spar caps, which form upper and lower flanges of spars of the rotor blade 202. For example, the shear webs 214, 216 can extend from the upper shell to the lower shell of the rotor blade 202. Although two shear webs 214, 216 are illustrated in FIGS. 2A through 2C, more or fewer of the shear webs 214, 216 can be included. The rotor blade 202 can have any desired spar, shear web, and spar cap configurations. In the example of FIGS. 2A through 2C, a first cavity 218 is formed between the leading edge 206 and the shear web 214, a second cavity 220 is formed between the shear web 214 and the shear web 216, and a third cavity 222 is formed between the shear web 216 and the trailing edge 208.

FIGS. 2A through 2C illustrate a defect 204 in the rotor blade 202 located at the leading edge 206, between the suction side 210 and the pressure side 212, adjacent to the first cavity 218. The defect 204 can be seen from the views 200i-200iii, in the external views of FIG. 2A and the internal views of FIGS. 2B and 2C. Because the rotor blade 202 is formed from a composite material, it can be difficult to determine the extent of the defect 204 from a limited number of views, such as internal or external views alone. For example, defects that are present in the rotor blade 202 can be merely superficial, or can be structural. When the defects are superficial, the defects may be visible from external or internal views alone, may be relatively small, or the like. No repair may be performed to address superficial defects. When the defects are structural, the defects may be visible from both the external and the internal views, may be relatively large, or the like. Depending on the severity of the structural defects, the rotor blade 202 may be repaired, replaced, operating characteristics of a wind turbine on which the rotor blade 202 is installed may be altered, or the like. By examining both the exterior and the interior of the rotor blade 202, the severity of defects present in the rotor blade 202 can be better determined, and appropriate actions can be taken. In other words, a risk level may be associated with or assigned to the rotor blade 202 and the defect 204, and appropriate corrective measures can be suggested based on the risk level associated with the rotor blade 202. The corrective measures can include monitoring the rotor blade 202, repairing the rotor blade 202, replacing the rotor blade 202, or altering control parameters of the wind turbine 200 in response to the risk level associated with or assigned to the rotor blade 202. This reduces repair costs and prevents failures of rotor blades 202.

In further detail, methods of the present disclosure relate to performing external inspections on the rotor blade 202, performing internal inspections on the rotor blade 202, and combining these external and internal inspections. The internal inspections can be correlated with the external inspections, for example, by correlating positions of the internal inspections with positions of the external inspections. Correlated internal and external inspections can be presented through a display. The correlated internal and external inspections create a detailed picture of the rotor blade 202, and allow assessment of external surfaces, internal surfaces, and internal structures of the rotor blade 202 there between. This can be used to better determine the extent of any defects present in the rotor blade 202, and can be used to provide improved recommendations on how best to address the defects. For example, when a defect is determined to be superficial, no repair steps may be performed. Depending on the severity of particular defects, the defects can be repaired, monitored at regular intervals, control characteristics of a wind turbine on which the rotor blade 202 is installed can be altered, the rotor blade 202 can be replaced, or the like.

Figures 3A, 3B:
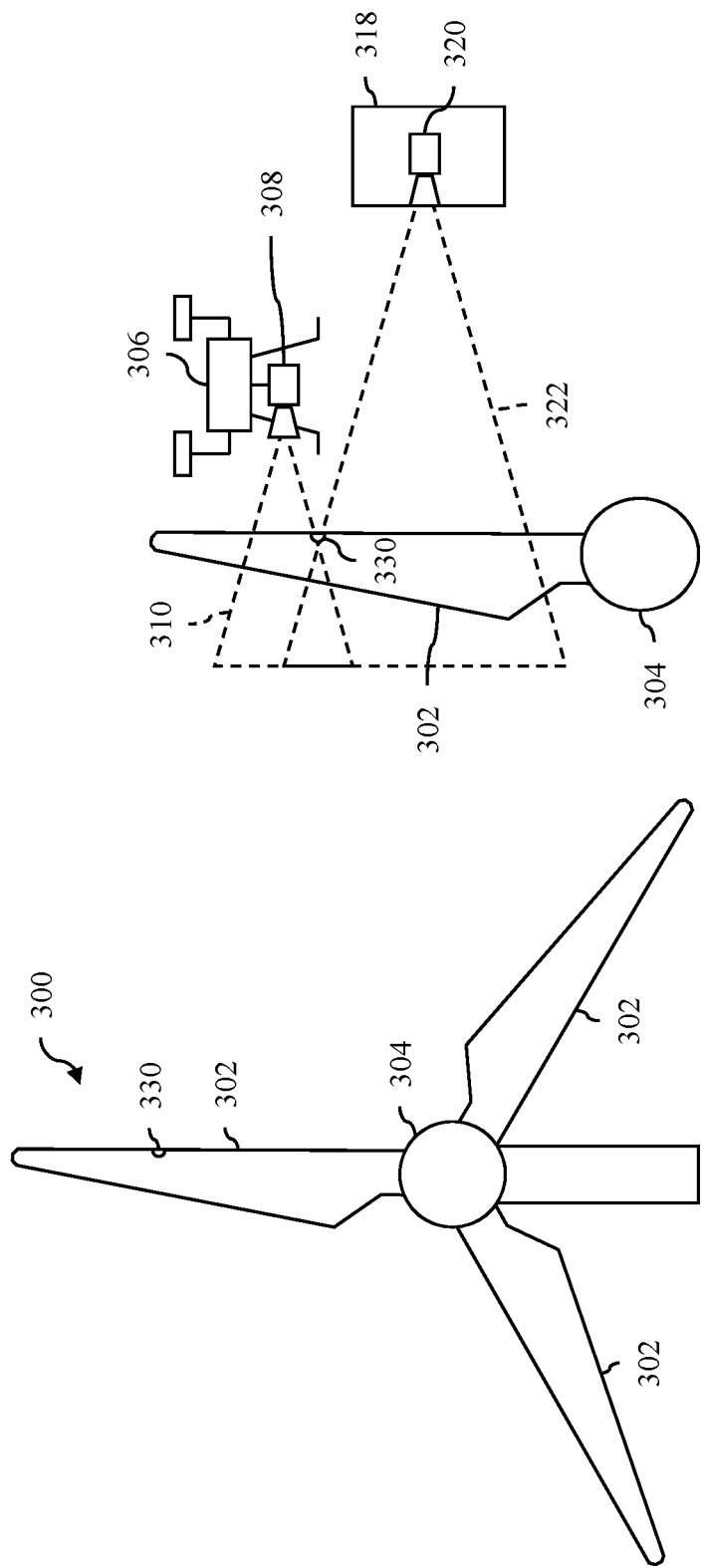
FIG. 3A shows a front view of a wind turbine positioned for an external inspection.
FIG. 3B shows a front view of a rotor blade during an external inspection.
Figure 3C:
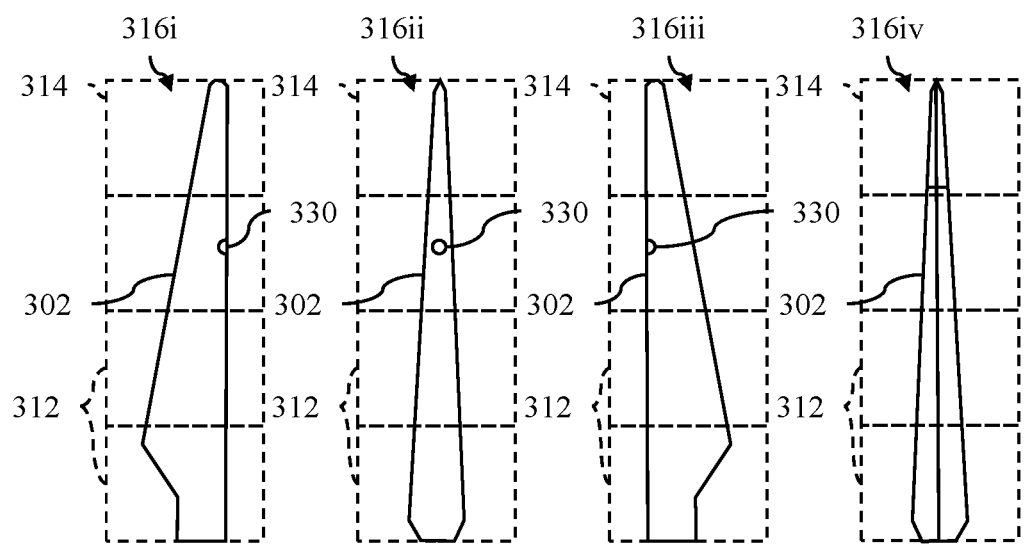
FIG. 3C shows multiple views of an exterior of a rotor blade produced by an external inspection.

FIGS. 3A through 3C illustrate a system and method of performing an external inspection on a rotor blade 302 of a wind turbine 300. FIG. 3A illustrates a perspective view of the wind turbine 300. FIG. 3B illustrates a side view of an unmanned aerial vehicle 306 and a stationary device 318 inspecting a rotor blade 302. FIG. 3C illustrates views 316 of a rotor blade 302 generated by an inspection of an exterior of the rotor blade 302.

In the example of FIG. 3A, three rotor blades 302 are attached to a rotor hub 304. As illustrated in FIG. 3A, the wind turbine 300 can be stopped so that one of the rotor blades 302 is disposed upward relative to the rotor hub 304 and has a vertical longitudinal axis (e.g., the longitudinal axis of the rotor blade 302 is disposed in a direction parallel to a gravitational direction). The other two rotor blades 302 can be disposed at positive and negative 120° relative to the vertical longitudinal axis of the rotor blade 302, respectively. However, in some examples, the external inspection can be performed with the rotor blades 302 in any desired position, or even as the rotor blades 302 and the rotor hub 304 are moving, such as rotating. As an example, Spanish Patent Application No. ES2796964B2, the entire disclosure of which is incorporated herein by reference, describes a method of inspecting rotor blades while the rotor blades are in motion.

FIG. 3B illustrates two methods of inspecting a rotor blade 302. In some examples, the rotor blade 302 can be inspected by an unmanned aerial vehicle (UAV) 306 (e.g., a drone). The UAV 306 can include one or more sensors 308, which can be used to inspect the rotor blade 302. The UAV 306 can inspect the rotor blade 302 by flying at a prescribed distance from the rotor blade 302, along an entire length of the rotor blade 302. The UAV can inspect the rotor blade 302 from one or more sides of the rotor blade 302, depending on how many views of the rotor blade 302 are desired. For example, as described above with respect to FIGS. 2A through 2C, four views of the rotor blade 302 can be inspected, such as views from a leading edge side, a trailing edge side, a suction side, and a pressure side. The UAV 306 can fly along the rotor blade 302 from each of these views in order to inspect the rotor blade 302.

The sensors 308 can have a field of view 310 that is smaller than the length of the rotor blade 302. As such, as illustrated in FIG. 3C, the sensors 308 can perform multiple analyses 312 (e.g., take multiple images) of the rotor blade 302, which can be stitched together to form an overall view 314 of the rotor blade 302 from each of views 316*i*-316*iv*. Stitching images together can include, according to some examples, combining multiple photographic images with overlapping fields of view to produce a segmented panorama or high-resolution image. In other words, the sensors 308 can take a photo sequence of the rotor blade 302 from each of the leading edge side, the trailing edge side, the suction side, and the pressure side, and these images can be stitched together to form a panoramic view of the rotor blade 302 in each of the views 316*i*-316*iv*. The view 316*i* of FIG. 3C illustrates the rotor blade 302 from a suction side of the rotor blade 302. The view 316*ii* of FIG. 3C illustrates the rotor blade 302 from a leading edge side of the rotor blade 302. The view 316*iii* of FIG. 3C illustrates the rotor blade 302 from a pressure side of the rotor blade 302. The view 316*iv* of FIG. 3C illustrates the rotor blade 302 from a trailing edge side of the rotor blade 302.

In some examples, the rotor blade 302 can be inspected by a stationary device 318. The stationary device 318 can include one or more sensors 320, which can be used to inspect the rotor blade 302. The stationary device 318 can inspect the rotor blade 302 by tilting/panning from a prescribed distance from the rotor blade 302 to inspect an entire length of the rotor blade 302. The stationary device 318 can inspect one or more sides of the rotor blade 302 depending on how many views of the rotor blade 302 are desired. For example, the stationary device 318 can be moved around the rotor blade 302 or the rotor blade 302 can be rotated about a longitudinal axis of the rotor blade 302 in order to capture multiple views of the rotor blade 302. As described above with respect to FIGS. 2A through 2C, four views of the rotor blade 302 can be inspected (e.g., from the leading edge side, the trailing edge side, the suction side, and the pressure side). The sensors 320 can have a field of view 322 that is smaller than the length of the rotor blade 302, and multiple analyses 312 (e.g., multiple images) of the rotor blade 302 can be stitched together to form the overall view 314 from each of the views 316*i*-316*iv*, as described above. The stationary device 318 can be positioned on the ground, on or over the nacelle of the wind turbine 300, or in any other position that can view and inspect the outer surfaces of the rotor blades 302 of the wind turbine 300.

The sensors 308 of the UAV 306 and/or the sensors 320 of the stationary device 318 may include any suitable sensors, equipment, mechanism, or the like that can be utilized to monitor, sense, locate, measure, identify, and/or detect a condition of the rotor blade 302. For example, the sensors 308, 320 can include visual cameras (e.g., optical sensors), infrared cameras, ultraviolet cameras, video cameras, thermographic cameras, other suitable cameras, ultrasonic detectors, x-ray detectors, other suitable imaging devices and sensors, light sources (e.g., a light-emitting diode (LED) array), acoustic sensors, proximity sensors, position sensors, displacement sensors, linear encoders, measurement devices, laser scaling devices, magnetic sensing equipment, ultrasound equipment, microwave instrumentation, thermography testing equipment and/or any other suitable equipment, sensors, mechanisms or the like. In examples in which the sensors 308, 320 include infrared sensors or thermographic cameras, the rotor blade 302 can be inspected quickly after the wind turbine 300 is stopped in a desired position, or while the rotor blades 302 are moving, which can allow for defects to show up in infrared due to heat differences in the rotor blade 302.

As illustrated in FIG. 3C, the views 316*i*-316*iv* can be used to identify or detect a defect 330 in the rotor blade 302. The defect 330 can be visible in multiple of the views 316*i*-316*iv*, such as in views 316*i*-316*iii*. A position of the defect 330 relative to the rotor blade 302 can be determined based on a position of the defect 330 along a known length of the rotor blade 302; characteristics of the sensors 308/320 (e.g., a focal length of the sensors 308/320, measurement by the sensors 308/320, or the like); distances from the UAV 306/stationary device 318 to the rotor blade 302; a position of the defect 330 relative to a leading edge, a trailing edge, another feature, or the like of the rotor blade 302; combinations thereof; or the like. Photogrammetry can be used to determine the position of the defect 330 relative to the rotor blade 302. In some examples, a 3D image of the rotor blade 302 can be generated, and each of the views 316*i*-316*iv* can be projected over the 3D image (e.g., a digital twin of the rotor blade 302), to better analyze the rotor blade 302. Machine learning and/or artificial intelligence can be used to project the views 316*i*-316*iv* over the 3D image of the rotor blade 302.

The UAV 306 and/or the stationary device 318, including the sensors 308, 320, can generate external data for the rotor blade 302. This external data can be stored in the UAV 306 and/or the stationary device 318, or can be sent to external devices by any suitable transmission means. The external data can also be referred to as external blade data. Transmitted external data can be referred to as an external data signal, a data stream, an external data stream, or the like. The UAV 306, the stationary device 318, and/or external devices to which the external data is streamed may analyze the external data in order to generate the views 316*i*-316*iv* and any other views to be displayed, to identify and detect defects on the rotor blade 302, and the like. The analysis of the external data may be used to correlate positions, such as to correlate positions of the external inspection with positions of an internal inspection. In some examples, positions in the external data, such as positions of defects, may be detected and identified, and the positions can be correlated with positions in internal data generated for the rotor blade 302. The analysis of the external data may also be used to provide suggested inspection, corrective, or operational actions to be taken with regards to the rotor blade 302 and any defects identified or detected thereon.

Figure 4B:
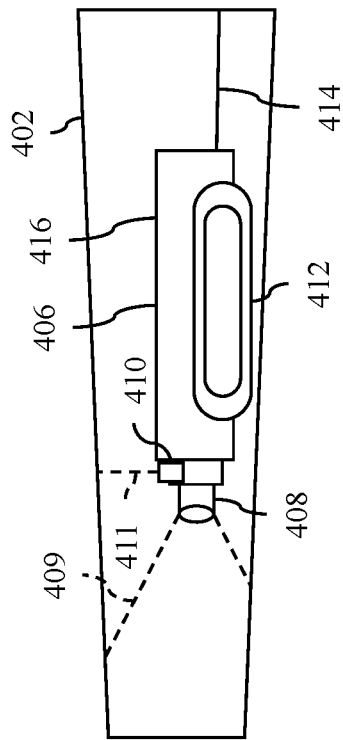
FIG. 4B shows a cross-sectional view of a portion of a rotor blade during an internal inspection.
Figure 4A:
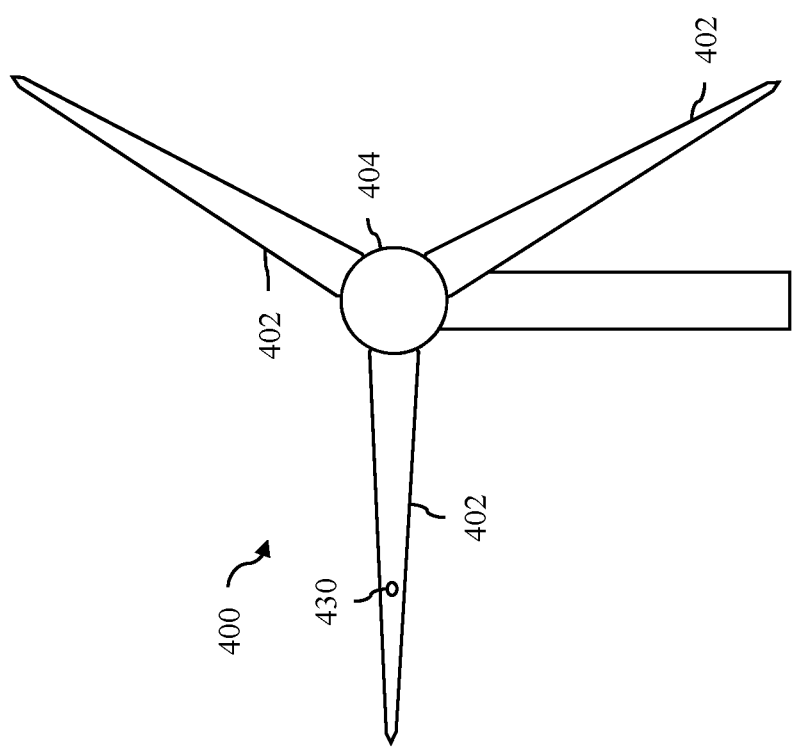
FIG. 4A shows a front view of a wind turbine positioned for an internal inspection.
Figure 4D:
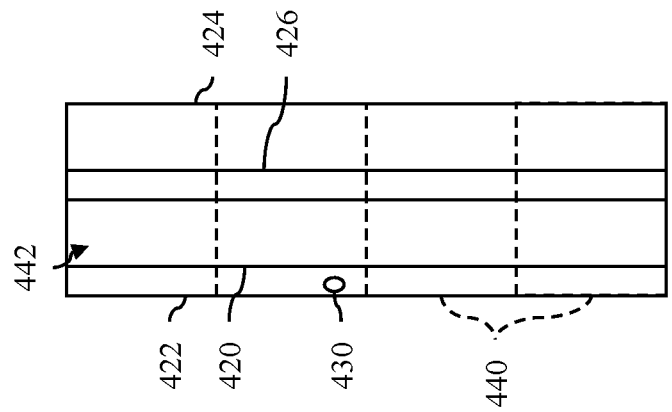
FIG. 4D shows a view of an interior of a rotor blade produced by an internal inspection.
Figure 4C:
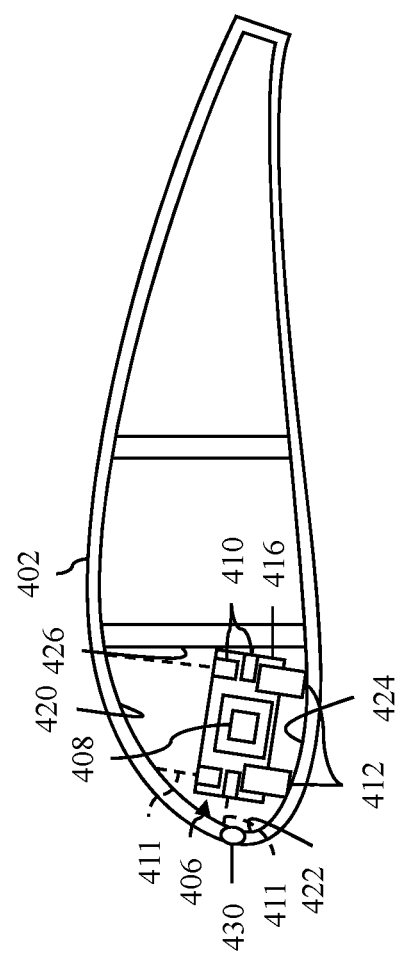
FIG. 4C shows a cross-sectional view of a portion of a rotor blade during an internal inspection.

FIGS. 4A through 4D illustrate a system and method of performing an internal inspection on a rotor blade 402 of a wind turbine 400. FIG. 4A illustrates a perspective view of the wind turbine 400. FIGS. 4B and 4C illustrate cross-sectional views of an unmanned ground vehicle 406 inspecting a rotor blade 402. FIG. 4B is taken along a plane parallel to a longitudinal axis of the rotor blade 402. FIG. 4C is taken along a plane perpendicular to the longitudinal axis of the rotor blade 402. FIG. 4D illustrates an overall view 442 of a cavity of a rotor blade 402 generated by an inspection of an interior of the rotor blade 402.

In the example of FIG. 4A, three rotor blades 402 are attached to a rotor hub 404. As illustrated in FIG. 4A, the wind turbine 400 can be stopped so that a rotor blade 402 to be analyzed has a horizontal longitudinal axis (e.g., the longitudinal axis of the rotor blade 402 is disposed in a direction perpendicular to a gravitational direction). The other two rotor blades 402 can be disposed at positive and negative 120° relative to the horizontal rotor blade 402. After the internal inspection is performed on one rotor blade 402, the rotor blades 402 can be rotated 120° about the rotor hub 404 and the next rotor blade 402 can be internally inspected. As such, each of the rotor blades 402 can be in the same position as the respective rotor blades 402 are inspected. In some examples, the internal inspection can be performed with the rotor blades 402 in other desired positions. For example, a rotor blade 402 to be analyzed may be disposed downward relative to the rotor hub 404 with a vertical longitudinal axis (e.g., the longitudinal axis of the rotor blade 402 is disposed in a direction parallel to the gravitational direction). In some examples, the ground vehicle 406 can climb the rotor blades 402 at an angle. In such examples, two rotor blades 402 to be analyzed may be disposed upward at angles of about 60 degrees and about 300 degrees, and a third rotor blade 402 may be disposed downward relative to the rotor hub 404 with a vertical longitudinal axis (e.g., the longitudinal axis of the rotor blade 402 is disposed in a direction parallel to the gravitational direction).

Each of the rotor blades 402 can be rotated about longitudinal axis of the respective rotor blade 402 so that one of a suction side or a pressure side of the rotor blade 402 faces upwards and the other of the suction side or the pressure side faces downwards. This can aid in a ground vehicle 406 traversing the rotor blade 402. However, in some examples, the rotor blades 402 can be rotated and positioned in other positions, such as with a leading edge or a trailing edge of the rotor blade 402 facing upwards.

FIGS. 4B and 4C illustrate an unmanned ground vehicle (UGV) 406 performing an inspection on the interior of the rotor blade 402. The UGV 406 can include one or more internal inspection sensors 408, distance sensors 410, tracks 412, and a cable 414, each of which can be arranged in, on, or coupled to a body 416. In the example illustrated in FIGS. 4B and 4C, the internal inspection sensor 408 faces towards a tip of the rotor blade 402, away from a root of the rotor blade 402. The internal inspection sensor 408 can face other directions, such as towards a root of the rotor blade 402, and can tilt, pan, and the like. The cable 414 can be attached to the body 416 opposite the internal inspection sensor 408. Two distance sensors 410 are disposed on the body 416 facing upwards and two distance sensors 410 are disposed on sides of the body 416 facing outwards in opposite directions. Although four distance sensors 410 are illustrated, more or fewer distance sensors 410 may be included, and may be positioned to determine the position of the UGV 406 relative to side surfaces of an interior of the rotor blade 402. The UGV 406 can include two tracks 412, which can be used to navigate the UGV 406 along a length of the rotor blade 402. Other configurations of the UGV 406 are contemplated by the present disclosure, such as UGVs 406 including more or fewer sensors 408, 410, including treads or wheels in place of the tracks 412, omitting the cable 414, and the like.

As discussed previously, in some examples, the rotor blade 402 to be analyzed can be disposed with a vertical longitudinal axis. In such examples, the tracks 412 of the UGV 406 can be omitted, and the UGV 406 can navigate vertically through the length of the rotor blade 402 by spooling the cable 414. In other words, the UGV 406 can be fed through the length of the rotor blade 402 using the cable 414 and gravity to control the position of the UGV 406. In some examples, the UGV 406 can include brushes or other spacers around a perimeter of the UGV 406 in order to control a distance of the UGV 406 from side surfaces of the rotor blade 402. The internal inspection sensor 408 can have a large field of view, such as up to 360 degrees. In some examples, an unmanned aerial vehicle (UAV) can be used to perform the internal inspection on the rotor blade 402 in place of the UGV 406, and the UAV can be the same as or similar to the UAV 306. The UAV can inspect the rotor blade 402 in any desired position. In some examples, other devices including any desired sensors can be used to perform the internal inspection.

The internal inspection sensors 408 may include any suitable sensors, equipment, mechanisms, or the like that can be utilized to monitor, sense, locate, measure, identify, and/or detect a condition of the rotor blades 402. For example, the sensors 408 can include visual cameras (e.g., optical sensors), infrared cameras, ultraviolet cameras, video cameras, thermographic cameras, other suitable cameras, ultrasonic detectors, x-ray detectors, other suitable imaging devices and sensors, light sources (e.g., a light-emitting diode (LED) array), acoustic sensors, proximity sensors, position sensors, displacement sensors, linear encoders, measurement devices, laser scaling devices, magnetic sensing equipment, ultrasound equipment, microwave instrumentation, thermography testing equipment and/or any other suitable equipment, sensors, mechanisms or the like.

In examples in which the internal inspection sensors 408 include infrared sensors or thermographic cameras, the rotor blade 402 can be inspected quickly after the wind turbine 400 is stopped in a desired position, or while the rotor blades 402 are moving, which can allow for defects to show up in infrared due to heat differences in the rotor blade 402. In some examples, the internal inspection sensors 408 can be included to inspect the rotor blades 402, and may be used to identify or detect any defects present in the rotor blades 402. The internal inspection sensors 408 can have a field of view 409 that images or otherwise analyzes top surfaces, bottom surfaces, and side surfaces of internal cavities of the rotor blade 402 as the UGV 406 moves along the length of the rotor blade 402.

The distance sensors 410 can be included to determine distances 411 between the UGV 406 and internal surfaces of the rotor blade 402 as the UGV 406 moves along the rotor blade 402. The distance sensors 410 can include visual cameras (e.g., optical sensors), infrared cameras, ultraviolet cameras, video cameras, thermographic cameras, other suitable cameras, ultrasonic detectors, x-ray detectors, other suitable imaging devices and sensors, light sources (e.g., a light-emitting diode (LED) array), acoustic sensors, proximity sensors, position sensors, displacement sensors, linear encoders, measurement devices, laser scaling devices, magnetic sensing equipment, ultrasound equipment, microwave instrumentation, thermography testing equipment and/or any other suitable equipment, sensors, mechanisms or the like. In some examples, the distance sensors 410 can include LiDAR.

In some examples, the UGV 406 can include four of the distance sensors 410. For example, two distance sensors 410 can be disposed on a top surface of the UGV 406 facing upward to measure distances 411 between the UGV 406 and a top surface 420 of the rotor blade 402 at different points. Two distance sensors 410 can be disposed on opposite side surfaces of the UGV 406 facing outward to measure distances 411 between the UGV 406 and opposite side surfaces 422, 426 of the rotor blade 402. In some examples, distances 411 between the UGV 406 and a bottom surface 424 of the rotor blade 402 can be known or assumed based on the heights of the tracks 412 of the UGV 406. In some examples, two additional distance sensors 410 can be disposed on a bottom surface of the UGV 406 facing downward to measure distances 411 between the UGV 406 and the bottom surface 424 of the rotor blade 402 at different points.

The distance sensors 410 can be used to determine the width and height of a cavity of the rotor blade 402 in which the UGV 406 is disposed. In some examples, a schematic of the rotor blade 402 may provide dimensions of the rotor blade 402. In such examples, dimensions determined by the distance sensors 410 can be compared with the dimensions of the rotor blade 402 to determine where in the rotor blade 402 the UGV 406 is located. In some examples, dimensions of the rotor blade 402 may be unknown. In such examples, dimensions of the exterior of the rotor blade 402 (e.g., dimensions based on an external inspection of the rotor blade 402, such as the external inspection discussed above with respect to FIGS. 3A through 3C) can be combined with thicknesses of the rotor blade 402 (e.g., thicknesses of the shell, shear webs, spars, spar caps, and the like of the rotor blade 402) in order to determine dimensions of the rotor blade 402. The dimensions determined by the distance sensors 410 can be compared with the dimensions of the rotor blade 402 to determine where in the rotor blade 402 the UGV 406 is located. In some examples, the UGV 406 can generate a model of the rotor blade 402 as the UGV 406 inspects the rotor blade 402, and this model can be used to determine where in the rotor blade 402 the UGV 406 is located with respect to data obtained by the sensors 408, 410 of the UGV 406. Accurately determining the position of the UGV 406 relative to the rotor blade 402 can be used to correlate positions in the internal inspections of FIGS. 4A through 4D with positions in the external inspections of FIGS. 3A through 3C. Thus, the position of the UGV 406 performing the internal inspections can be correlated with positions along the rotor blade 402 from the external inspections.

The cable 414 can be used to measure a distance the UGV 406 has traveled along the length of the rotor blade 402, and can be used to determine a position of the UGV 406 relative to the rotor blade 402 as the UGV 406 moves along the rotor blade 402. A bottom surface of the rotor blade 402 can be curved, and the rotor blade 402 can bend, deflect, or move. The cable 414 can track a bottom surface of the rotor blade 402, therefore the cable 414 can take into account any curvature, deflection, or movement of the rotor blade 402 in tracking the position of the UGV 406. In some examples, the cable 414 can be omitted, and the UGV 406 can track its own distance traveled through the rotor blade 402 by tracking how far the tracks 412 move. In some examples, the UGV 406 can include an infrared sensor (e.g., a forward-looking infrared sensor), which can be used to track a distance from the UGV 406 to a tip of the rotor blade 402 or the like. A reference point for measuring with the cable 414 or the tracks 412 can be a blade root of the rotor blade 402. The blade root of the rotor blade 402 can be visible from an exterior of the rotor blade 402, and this can be used to correlate positions in the internal inspections of FIGS. 4A through 4D with positions in the external inspections of FIGS. 3A through 3C. Thus, the position of the UGV 406 performing the internal inspections can be correlated with positions along the rotor blade 402 from the external inspections.

In some examples, a position of the UGV 406 relative to the rotor blade 402 can be tracked through positioning systems or the like. These systems can include real-time kinetic positioning (RTK), global positioning systems (GPS), ultra-wideband (UWB) positioning, or any other positioning systems. A positioning sensor can be disposed on the UGV 406 and a positioning sensor can be positioned on the rotor blade 402 in order to determine a position of the UGV 406 relative to the rotor blade 402. The positioning sensor on the rotor blade 402 can be positioned anywhere along the rotor blade 402, such as at a tip or root of the rotor blade 402. However, by including a single positioning sensor on the rotor blade 402, deflection or curvature of the rotor blade 402 may not be taken into account. In order to take deflection or curvature of the rotor blade 402 into account, a second positioning sensor can be placed on the rotor blade 402 (e.g., a positioning sensor can be placed at a root and a tip of the rotor blade 402), and the three positioning sensors can determine a position of the UGV 406 relative to the rotor blade 402 and curvature of the rotor blade 402. In some examples, two sensors disposed outside the rotor blade 402 can be used to triangulate a position of the UGV 406 in space. The position of the UGV 406 in space as the UGV 406 moves along the rotor blade 402 can be compared with known dimensions, slopes, or the like within the rotor blade 402 in order to determine any deflection or movement of the rotor blade 402.

In some examples, curvature, movement, or deflection of the rotor blade 402 can be taken into account by an external sensor that images or otherwise analyzes the curvature, movement, or deflection of the rotor blade 402 as the internal inspection is performed. By synchronizing this external inspection with the internal inspection of the UGV 406, the precise position of the UGV 406 relative to the rotor blade 402 can be determined, regardless of the curvature, movement, or deflection of the rotor blade 402. In some examples, the external inspection of FIGS. 3A through 3C can be formed contemporaneously with the internal inspection of FIGS. 4A through 4D and the UAV 306 and/or the stationary device 318 can track the position of the UGV 406 relative to the blade 402. Thus, stitching and position correlation processes from the external inspection and the internal inspection can be performed in real-time. In some examples, other drones or sensors (e.g., flying, ground, stationary, or dynamic sensors) external to the rotor blade 402 can be used to track the position of the UGV 406 relative to the rotor blade 402. Positions of the UGV 406 can be determined by and communicated by radio, hardwire (e.g., through the cable 414), other wireless methods, or any other appropriate data transmission modalities.

Accurately determining the position of the UGV 406 relative to the rotor blade 402 can be used to correlate positions in the internal inspections of FIGS. 4A through 4D with positions in the external inspections of FIGS. 3A through 3C. Thus, the position of the UGV 406 performing the internal inspections can be correlated with positions along the rotor blade 402 from the external inspections.

As illustrated in FIG. 4C and discussed above with respect to FIGS. 2A through 2C, the rotor blade 402 can include a leading edge, a trailing edge, a pressure side, a suction side. The suction side can be formed from an upper shell, the pressure side can be formed from a lower shell, and shear webs can extend between the upper and lower shells. In the example of FIG. 4C, the rotor blade 402 can include two shear webs, which form three cavities in the rotor blade 402: a first cavity between the leading edge and a first shear web, a second cavity between the first shear web and a second shear web, and a third cavity between the second shear web and the trailing edge. The UGV 406 can travel through each of the first, second, and third cavities in order to inspect the entire interior of the rotor blade 402. In some examples, the internal inspection can be based on defects identified or detected by the external inspection, and the UGV 406 can travel through specific ones of the first, second, and third cavities in order to inspect for identified or detected defects.

As discussed previously, the UGV 406 can include distance sensors 410 on sides of the UGV 406, which detect distances between the UGV 406 and side surfaces of the interior of the rotor blade 402. The distance sensors 410 can detect distances between the UGV 406 and the shear webs, the leading edge, and the trailing edge, as the UGV 406 moves along the rotor blade 402 in the first, second, and third cavities in order to determine the position of the UGV 406 along a chord between the leading edge and the trailing edge. This can be used to determine specific positions of defects relative to the leading edge and the trailing edge. The leading edge and the trailing edge of the rotor blade 402 can be visible from an exterior of the rotor blade 402, and this can be used to correlate positions in the internal inspections of FIGS. 4A through 4D with positions in the external inspections of FIGS. 3A through 3C. Thus, the position of the UGV 406 performing the internal inspections can be correlated with positions along the rotor blade 402 from the external inspections.

The internal inspection sensors 408 can have a field of view 409 with a small focal point relative to a length of the rotor blade 402. The internal inspection sensors 408 can take zenithal images into the rotor blades 402, such as into each cavity of the rotor blades 402. As such, the internal inspection sensors 408 can perform multiple analyses 440 (e.g., take multiple images) of the rotor blade 402, as the UGV 406 moves along each of the cavities of the rotor blade 402. The multiple analyses 440 can be stitched together to form an overall view 442 of the rotor blade 402. As illustrated in FIG. 4D, 3D analyses generated by the internal inspection sensors 408 can be presented as 2D images of each of the top surface 420, the side surface 422, the bottom surface 424, and the side surface 426 in the overall view 442. The internal inspection sensors 408 can take a photo sequence or video sequence of the rotor blade 402 in each of the cavities of the rotor blade 402, and these images can be stitched together to form panoramic or 3D views of each of the cavities of the rotor blade 402, with a single panoramic view being illustrated in FIG. 4D. The overall view 442 illustrated in FIG. 4D illustrates the first cavity between the leading edge and the first shear web. Similarly, overall views of the second cavity between the first shear web and the second shear web and of the third cavity between the second shear web and the trailing edge can be generated.

As illustrated in FIG. 4D, the overall view 442 can be used to identify or detect a defect 430 in the first cavity of the rotor blade 402. The defect 430 can be visible on one or more of the surfaces 420, 422, 424, 426 of the first cavity, such as the side surface 422 in FIG. 4D. A position of the defect 430 relative to the rotor blade 402 can be determined based on the position of the UGV 406 relative to the blade when the defect 430 is identified or detected by the internal inspection sensors 408 and characteristics (e.g., a focal length or the like) of the internal inspection sensors 408. The position of the UGV 406 relative to the rotor blade 402 can be determined by any of the above-described methods. Photogrammetry can be used to determine the position of the defect 430 relative to the rotor blade 402. The position of the defect 430 relative to the rotor blade 402 can be correlated with positions of any defects found on an exterior of the rotor blade 402 (e.g., the defect 330 on the rotor blade 302, discussed above with respect to FIGS. 3A through 3C). By correlating the defect 430 on an internal surface of the rotor blade 402 with the defect 330 on an external surface of the rotor blade 302, an extent of the defect 430, 330 can be determined, and a course of action for addressing the defect 430, 330 can be selected. In some examples, the correlation between positions of the internal inspection and positions of the external inspection can be within inches or centimeters of one another (e.g., within about 0.5 cm, about 1 cm, about 2 cm, or the like), which can aid in determining the exact extent of defects 330, 430 in the rotor blades 302, 402.

In some examples, a 3D image of the rotor blade 402 can be generated based on the internal inspection or known dimensions of the rotor blade 402. The overall views generated by the internal inspection can be projected over the 3D image (e.g., a digital twin of the rotor blade 402), to better analyze the rotor blade 402. Machine learning and/or artificial intelligence can be used to project the overall views of the inside surfaces of the rotor blade 402 over the 3D image of the rotor blade 402. This 3D image of the interior of the rotor blade 402 can be correlated with a 3D image of the exterior of the rotor blade 302 in order to assess the extent of any defects 330, 430 in the rotor blade 302, 402.

The UGV 406, including the internal inspection sensors 408, can generate internal data for the rotor blade 402. This internal data can be stored in the UGV 406, or can be sent to external devices by any suitable transmission means. The internal data can also be referred to as internal blade data. Transmitted internal data can be referred to as an internal data signal, a data stream, an internal data stream, or the like. The UGV 406 and/or external devices to which the internal data is streamed may analyze the internal data in order to generate the overall view 442 and any other views to be displayed, to identify and detect defects on the rotor blade 402, and the like. The analysis of the internal data may be used to correlate positions, such as to correlate positions of the internal inspection with positions of the external inspection (e.g., the external inspection of FIGS. 3A through 3C). In some examples, positions in the internal data, such as positions of defects, may be detected and identified, and the positions can be correlated with positions in external data generated for the rotor blade 402. The analysis of the internal data may also be used to provide suggested inspection, corrective, or operational actions to be taken with regards to the rotor blade 402 and any defects identified or detected thereon.

Figure 5A:
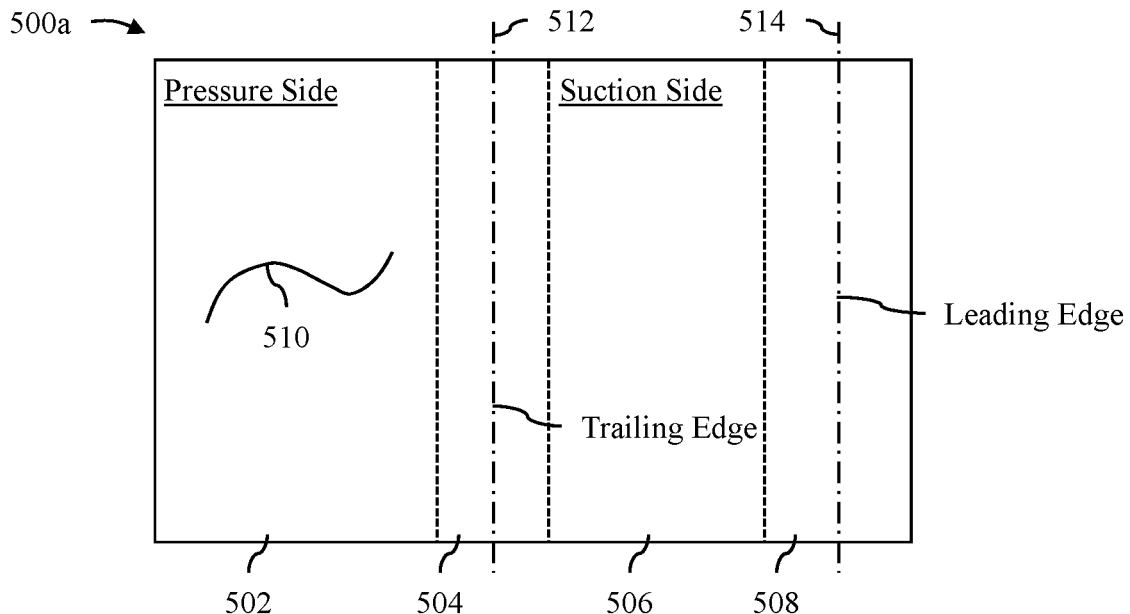
FIG. 5A shows exterior images of a rotor blade.
Figure 5B:
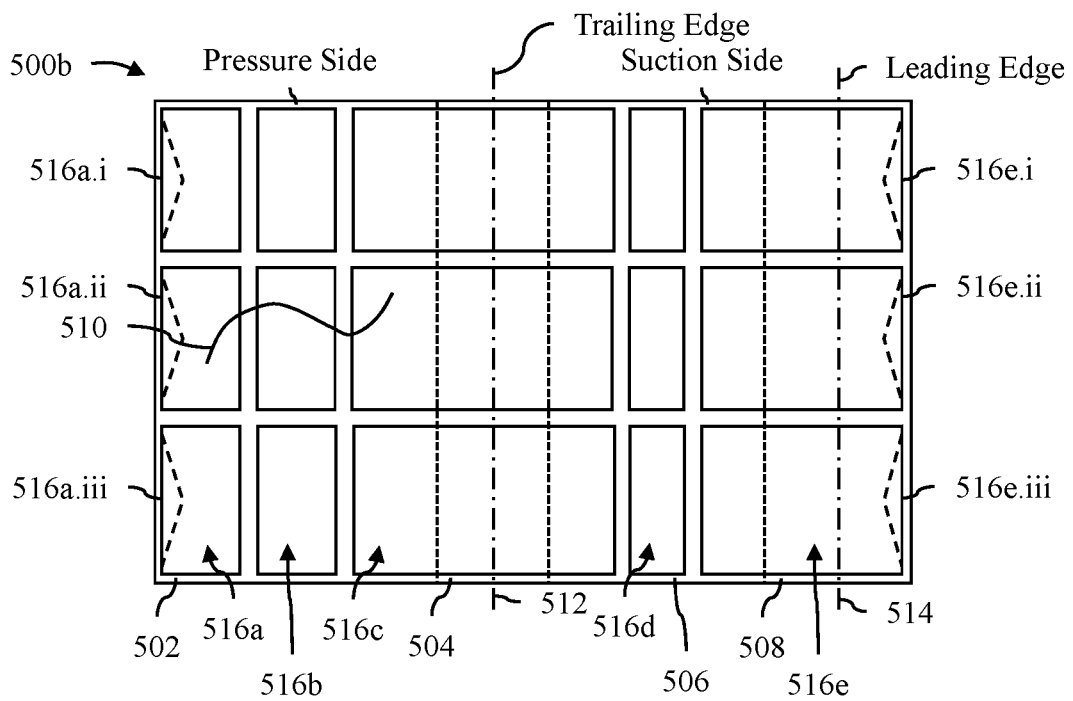
FIG. 5B shows interior images of the rotor blade of FIG. 5A overlaid on the exterior images of FIG. 5A.

FIGS. 5A and 5B illustrate displays 500a and 500b, respectively, that can be generated based on external and internal inspections of a rotor blade (e.g., based on the inspections described above in reference to FIGS. 3A through 4D). The display 500a illustrated in FIG. 5A can include external images of the rotor blade from various views overlaid next to one another. More specifically, the display 500a includes a view 502 of a pressure side of the rotor blade, a view 504 of a trailing edge of the rotor blade, a view 506 of a suction side of the rotor blade, and a view 508 of a leading edge of the rotor blade. The view 502 of the display 500a illustrates a defect 510 present on an exterior of the side of the rotor blade. The view 504 illustrates a trailing edge 512 of the rotor blade and the view 508 illustrates a leading edge of the rotor blade. The images of the display 500a can be generated by an external inspection, such as the external inspections described above with respect to FIGS. 3A through 3D.

The display 500b illustrated in FIG. 5B can include internal images 516a-516c (illustrated as dashed lines) of the rotor blade from various views overlaid over the display 500a of FIG. 5A and the external images of the rotor blade. The display 500b includes the view 502 of the pressure side of the rotor blade, the view 504 of the trailing edge of the rotor blade, the view 506 of the suction side of the rotor blade, and the view 508 of the leading edge of the rotor blade.

The internal images that are overlaid on the display 500a in the views 502-508 can be generated based on internal inspections that are performed in each of one or more cavities of the rotor blade. For example, the display 500b illustrates an example in which a rotor blade includes three cavities. Internal images 516a and 516e in a first cavity between the leading edge 514 and a fore shear web (e.g., the first cavity 218 illustrated in FIGS. 2B and 2C) are overlaid on the views 502 and 508. Internal images 516b and 516d in a second cavity between the fore shear web and an aft shear web (e.g., the second cavity 220 illustrated in FIGS. 2B and 2C) are overlaid on the views 502 and 506. Internal images 516c in a third cavity between the aft shear web and the trailing edge 512 (e.g., the third cavity 222 illustrated in FIGS. 2B and 2C) are overlaid on the views 502-506. The view 502 of the display 500b includes the internal images 516a-516c that each include a portion of the defect 510, and which illustrate that the defect 510 is present on both exterior and interior surfaces of the rotor blade.

The size of the internal images that are overlaid on the display 500a can be smaller than the external images of the display 500b due to thickness of the structures of the rotor blade, such as the shear webs, the shell, and any other components of the rotor blade. Individual images of the internal images 516a, 516b, 516d, and 516e may be taken at the same time and divided in order to accurately overlay individual images on the external images of the display 500a. The individual images of the internal inspection can be divided based on which cavity the images are taken, and they can be divided along the length of the rotor blade, as illustrated by images 516a.i-516a.iii and images 516c.i-516c.iii, which illustrate division of the images along the length of the rotor blade. The internal inspection can further generate images of the fore and aft shear webs, which do not overlap portions of the external images, and which can be represented as a fold in the display 500b, or represented in additional images. The internal images of the display 500b that are overlaid on the display 500a can be generated by an internal inspection, such as the internal inspections described above with respect to FIGS. 4A through 4D.

As discussed previously, and as illustrated by the displays 500a and 500b of FIGS. 5A and 5B, positions on the exterior of the rotor blade can be correlated with positions on the interior of the rotor blade. As such, when the defect 510 is identified or detected on the rotor blade, the display 500a can present external images and the display 500b can present external and internal images of the rotor blade that are correlated with one another. As illustrated in FIG. 5B, this can be used to present external and internal images of the defect 510 on the rotor blade. The external and internal images of the rotor blade can be examined in order to determine the extent of the defect 510, to determine the severity of damage to the rotor blade, and to aid in selecting appropriate corrective actions to rectify the defect 510. In other words, a risk level may be associated with or assigned to the rotor blade and the defect 510, and appropriate corrective measures can be suggested based on the risk level associated with or assigned to the rotor blade. In the example of FIG. 5B, the defect 510 is present on the external images of the view 502 and the internal images 516a-516c. Because the defect 510 is present in both the external images of the view 502 and the internal images 516a-516c, the defect 510 can be classified as a structural defect, and appropriate corrective measures can be selected. In other examples, defects may only be present in the external images of the views 502-508 or in the internal images 516a-516e, and the defects may have various sizes, thus different appropriate corrective measures can be selected. The corrective measures can include monitoring the rotor blade, repairing the rotor blade, monitoring the rotor blade over time, replacing the rotor blade, or altering control parameters of a wind turbine on which the rotor blade is installed in response to the risk level associated with or assigned to the rotor blade.

FIG. 5A illustrates the display 500a with external images and FIG. 5B illustrates the display 500b with internal images overlaid on the external images of the display 500a of FIG. 5A. However, any appropriate images of the exterior surfaces and interior surfaces of the rotor blade can be displayed. In some examples, an external image of the rotor blade can be displayed, and a user can swipe, tap, or otherwise manipulate the external image to view a corresponding internal image of the rotor blade. In some examples, a 3D model of the rotor blade can be generated based on the external and internal inspections of the rotor blade, and the 3D model can be manipulated to view estimated damage to the rotor blade between the internal and external surfaces of the rotor blade. In some examples, the displays 500a and 500b can automatically select the most relevant images of the rotor blade to display to a user. For example, the displays 500a and 500b can selectively present images that include defects. Specifically, the displays 500a and 500b could present images of the view 502 showing the defect 510, such as the internal images 516a-516c overlaid on the view 502, without displaying the internal images 516d and 516e or the views 504-508.

External data collected by the UAV 306 and/or the stationary device 318 and internal data collected by the UGV 406 can be corrected and scaled in order to provide accurate views of external and internal surfaces of the rotor blades 302, 402. This correction and scaling can be used to generate the views 316i-316iv, the overall view 442, and the displays 500a and 500b. The external data and the internal data can be corrected and scaled based on characteristics of the sensors 308, 320, 408 (e.g., focal lengths, fields of view, and the like); known, calculated, or estimated dimensions of the rotor blades 302, 402; tracked or estimated positions of the UAV 306, the stationary device 318, and the UGV 406 during the external and internal inspections; and the like. As such, the images that are generated and displayed, including the views 316*i*-316*iv*, the overall view 442, and the displays 500*a* and 500*b*, can have correct scaling, distances, and relative locations, and locations of any defects 330, 430, 510 can be accurately determined, viewed, and correlated.

Figure 6:
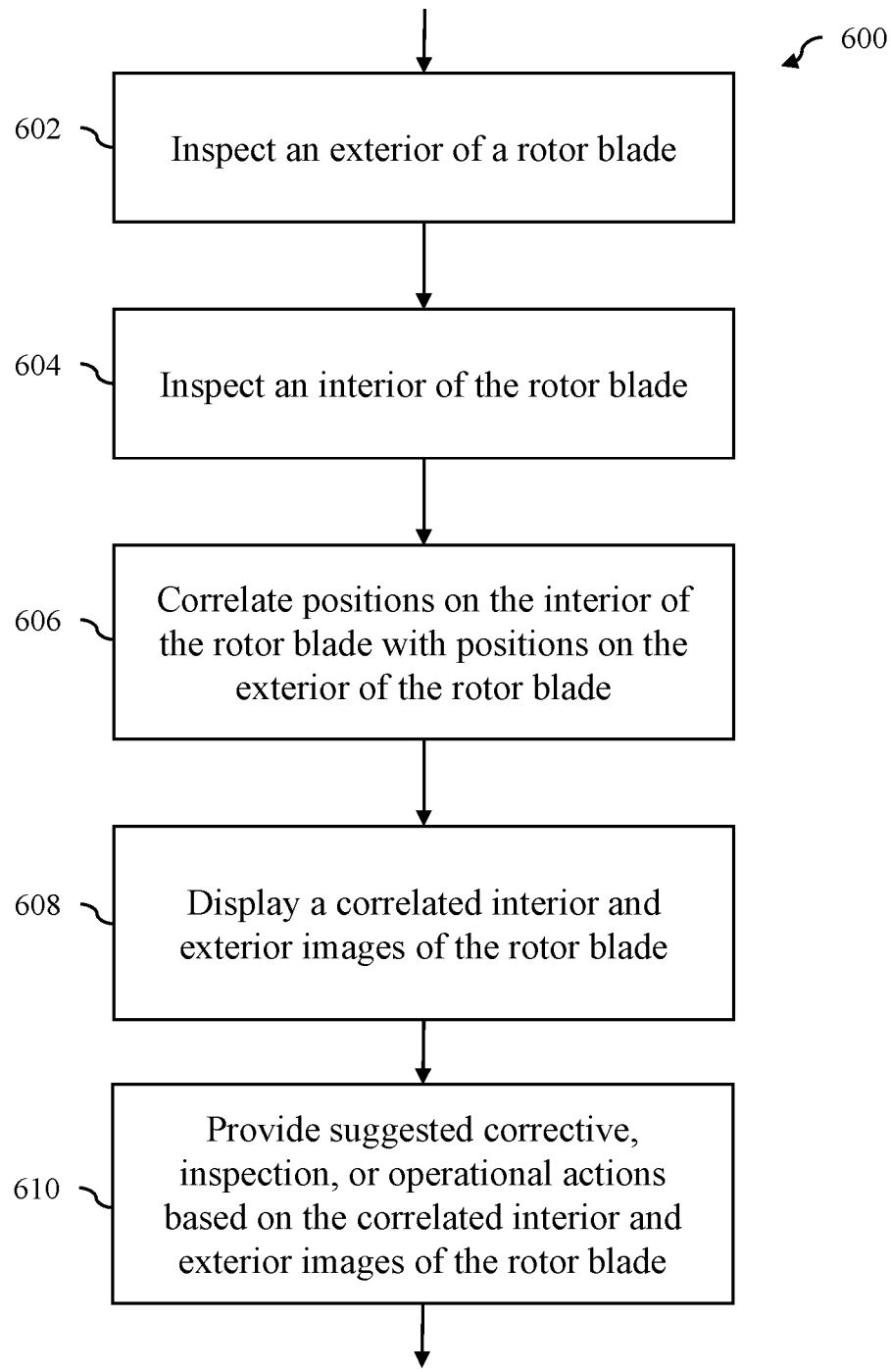
FIG. 6 shows a flow chart of a method for performing an inspection on a rotor blade.

FIG. 6 illustrates a method 600 of performing external and internal inspections on a rotor blade. In step 602, an exterior of the rotor blade is inspected. The exterior of the rotor blade can be inspected by systems and methods the same as or similar to those discussed above with respect to FIGS. 3A through 3C. Specifically, the exterior of the rotor blade can be imaged or otherwise analyzed by a UAV 306, a stationary device 318, or the like. Positions of defects on the exterior surface of the rotor blade can be determined based on relative positions of the defects along the length of the rotor blade, relative positions of the defects between the leading edge and the trailing edge, and the like. The defects may be located on any of the leading edge, the trailing edge, the suction side, or the pressure side of the rotor blade. The rotor blade can be imaged or analyzed from multiple views in order to identify or detect defects anywhere on the rotor blade. For example, the exterior inspection of the rotor blade may generate views of the rotor blade from the suction side, the leading edge side, the trailing edge side, and the pressure side; however, any other desired views of the rotor blade can be generated. Step 602 can be used to generate panoramic images, 3D models, or the like of the exterior surfaces of the rotor blade, which can be used to assess any defects present on the exterior surfaces of the rotor blade.

In step 604, an interior of the rotor blade is inspected. The interior of the rotor blade can be inspected by systems and methods the same as or similar to those discussed above with respect to FIGS. 4A through 4D. Specifically, the interior of the rotor blade can be imaged or otherwise analyzed by a UGV, or the like. Positions of defects on the interior surface of the rotor blade can be determined based on relative positions of the defects along the length of the rotor blade, relative positions of the defects between the leading edge and the trailing edge, and the like. The positions of the defects along the length of the rotor blade can be tracked by determining a position of the UGV relative to the rotor blade through measuring a cable attached to the UGV, tracking a distance traveled by the UGV (e.g., tracking a distance traveled by the UGV's tracks), tracking the UGV with a positioning system, tracking dimensions of the cavity in the rotor blade surrounding the UGV, or the like. The positions of the defects relative to the leading edge and trailing edge of the rotor blade can be tracked by tracking distances to surfaces of the cavity in the rotor blade surrounding the UGV, tracking features of the rotor blade (e.g., the leading edge, the trailing edge, shear webs, and the like), or the like. The rotor blade may include multiple cavities, and the UGV may travel down each of the cavities to identify or detect defects anywhere on the rotor blade. Step 604 can be used to generate panoramic images, 3D models, or the like of the interior surfaces of the rotor blade, which can be used to assess any defects present on the interior surfaces of the rotor blade. In some examples, the UGV can have external images stored in a memory thereof, and the UGV can compare positions of the UGV with the external images to correlate the internal inspection with the external images as the UGV performs the internal inspection.

In step 606, positions on the interior of the rotor blade are correlated with positions on the exterior of the rotor blade. The positions on the interior of the rotor blade can be correlated with the positions on the exterior of the rotor blade by systems and methods the same as or similar to those discussed above with respect to FIGS. 3A through 4D. Positions of defects on the exterior surface of the rotor blade can be determined based on relative positions of the defects along the length of the rotor blade, relative positions of the defects between the leading edge and the trailing edge, and the like. Positions of defects on the interior surface of the rotor blade can be determined based on relative positions of the defects along the length of the rotor blade, relative positions of the defects between the leading edge and the trailing edge, and the like. The positions of the defects along the length of the rotor blade can be tracked by determining a position of the UGV relative to the rotor blade through measuring a cable attached to the UGV, tracking a distance traveled by the UGV (e.g., tracking a distance traveled by the UGV's tracks), tracking the UGV with a positioning system, tracking dimensions of the cavity in the rotor blade surrounding the UGV, or the like. The positions of the defects relative to the leading edge and trailing edge of the rotor blade can be tracked by tracking distances to surfaces of the cavity in the rotor blade surrounding the UGV, tracking features of the rotor blade (e.g., the leading edge, the trailing edge, shear webs, and the like), or the like.

In step 608, correlated interior and exterior images of the rotor blade are displayed. The correlated interior and exterior images that are generated and displayed can be the same as or similar to the displays 500*a* and 500*b* discussed above with respect to FIGS. 5A and 5B. Correlated interior and exterior images can be displayed for any defects identified or detected by the external and/or internal inspections of the rotor blade. In some examples, a 3D model of the rotor blade can be generated based on the external and internal inspections of the rotor blade, and the 3D model can be presented including exterior and interior images of the rotor blade. By providing the interior images correlated with the exterior images, the extent of the defects can be determined. For example, depending on whether defects are present on both exterior and interior surfaces of the rotor blade, and depending on the size of defects present on the exterior and interior surfaces of the rotor blade, the severity of the defects can be characterized. In other words, a risk level may be associated with or assigned to the rotor blade and any defects present thereon.

In step 610, suggested actions can be provided based on the correlated interior and exterior images of the rotor blade. The suggested actions can include corrective, inspection, or operational actions. As discussed in reference to step 608, the severity of defects can be characterized based on the correlated interior and exterior images of the rotor blade. As an example, defects can be characterized as superficial or structural. In cases in which superficial defects are identified or detected, the suggested actions may include suggested inspection actions, and corrective or operational actions may not be suggested. The suggested inspection actions may include suggested inspection intervals, a suggestion for a subsequent inspection, or the like. The suggested inspection actions may be used to track defects in rotor blades over time. In cases in which structural defects are identified or detected, the suggested actions may include inspection actions, corrective actions, and/or operational actions. The corrective actions may include repairing an identified or detected defect, replacing a rotor blade with a defect, or the like. The operational actions may include altering use characteristics of a wind turbine on which a rotor blade is installed or the like. The suggested actions may be determined by a user viewing the display, by a computer or other processor, such as a computer that generates the display, or the like. In other words, based on the risk level associated with or assigned to the rotor blade and any defects present thereon, appropriate inspection, corrective, or operation actions can be suggested. By suggesting and performing appropriate inspection, corrective, or operation actions, defects present on rotor blades can be inexpensively repaired, and failures of the rotor blades can be avoided.

In some examples, the method 600 can further include collecting and aggregating external and internal sensor data obtained from performing the external and internal inspections. For example, external and internal sensor data obtained from inspecting multiple rotor blades from multiple wind turbines can be collected and aggregated as data sets. The data sets can further include data related to actions suggested in response to inspections, actions taken in response to inspections, and outcomes following inspections. These data sets can be analyzed by machine learning algorithms and/or artificial intelligence to provide enhanced predictive analysis and to provide improved suggested actions to be taken.

Although the method 600 is illustrated and described as being performed in a particular order, a person of skill in the art will understand that the steps of the method 600 can be informed in any suitable order. For example, the exterior and interior inspection steps 602, 604 can be performed in any desired order, or contemporaneously. The correlation of step 606 can be performed contemporaneously or subsequent to the exterior and interior inspection steps 602, 604. For example, the correlation of step 606 can be performed in real-time as each of the exterior and interior inspection steps 602, 604 are performed, after the exterior and interior inspection steps 602, 604 are performed, combinations thereof, or the like. The display of step 608 can be performed during the exterior and interior inspection steps 602, 604 (e.g., in real-time), and the display can be generated, updated, or the like continuously as the exterior and interior inspection steps 602, 604 are performed (e.g., in real-time). The suggestions of step 610 can be provided in real time as defects are identified or detected on a rotor blade.

Figure 7:
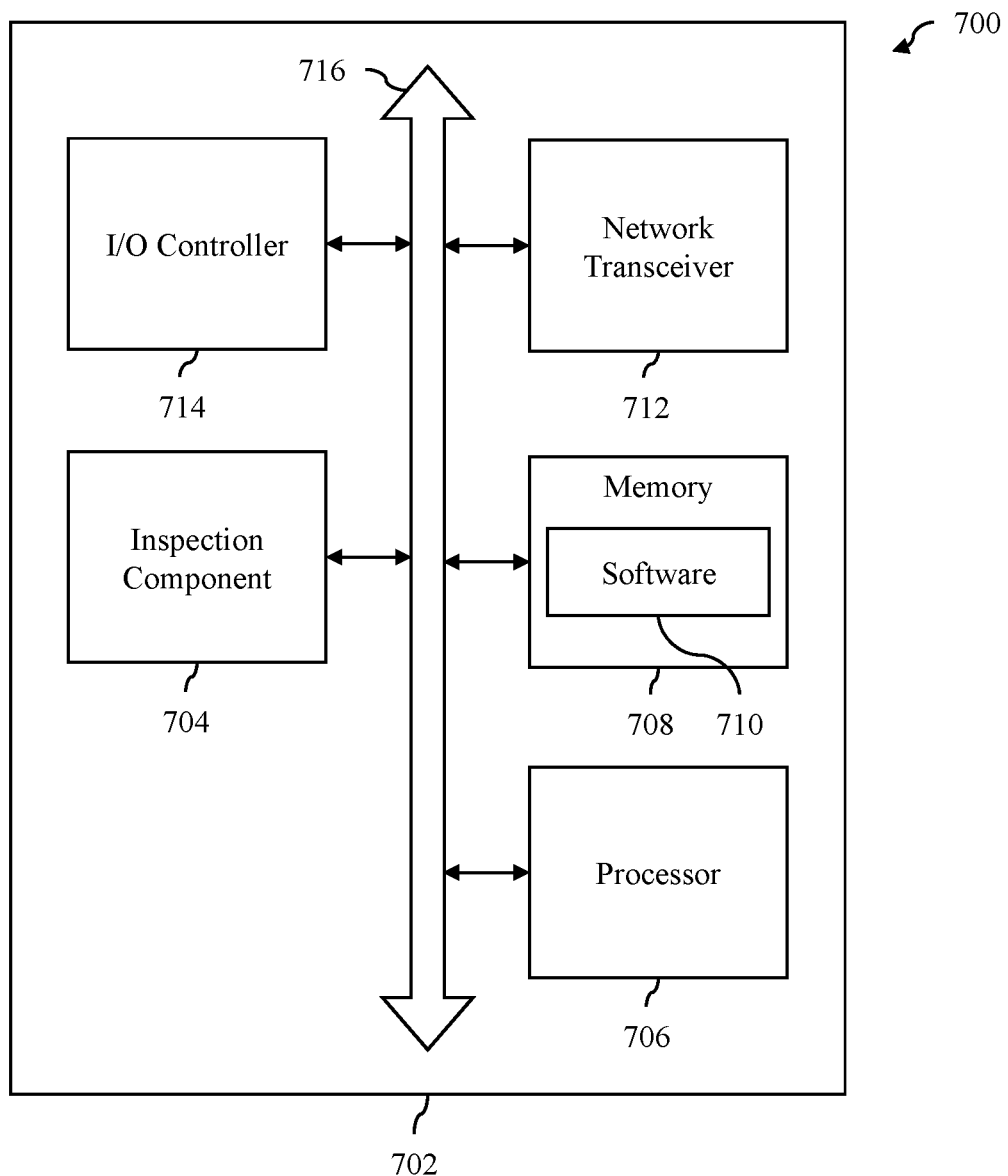
FIG. 7 shows a block diagram of a computing device that supports techniques for performing external and internal inspections on a rotor blade.

FIG. 7 shows a diagram of a system 700 including a device 702 that supports techniques for conducting external and internal inspections of rotor blades in accordance with aspects of the present disclosure. The device 702 may be an example of or include the components of a computer, a computing device, a computing system, or another electronic device. The device 702 may be an example of a portable electronic device, a computer, a laptop computer, a tablet computer, a smartphone, a cellular phone, a wearable device, an internet-connected device, a server, a database, or the like. In some examples, the device 702 may be configured for bi-directional wireless communication with other systems or devices using a base station or access point, such as the UAV 306, the stationary device 318, or the UGV 406, discussed above with respect to FIGS. 3A through 4D.

The device 702 may include an inspection component 704, a processor 706, a memory 708, software 710, a network transceiver 712, and an I/O controller 714. These components may be in electronic communication with one another via one or more buses (e.g., a bus 716). The device 702 may communicate wirelessly with one or more other devices or computing systems over a network using the network transceiver 712.

The inspection component 704 may implement the functions described with reference to the method 600 of FIG. 6. The inspection component 704 may be implemented in hardware, software executed by the processor 706, firmware, or any combination thereof.

The processor 706 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). The processor 706 may be configured to execute computer-readable instructions stored in a memory to perform various functions (e.g., functions or tasks supporting techniques for performing external and internal inspections on a rotor blade of a wind turbine).

The memory 708 may include random access memory (RAM) and read only memory (ROM). The memory 708 may store computer-readable, computer-executable software 710 including instructions that, when executed, cause the processor to perform various functions described herein. In some cases, the memory 708 may contain, among other things, a BIOS which may control basic hardware or software operation such as the interaction with peripheral components or devices.

The software 710 may include code to implement aspects of the present disclosure, including code to support techniques for performing external and internal inspections on a rotor blade. The software 710 may be stored in a non-transitory computer-readable medium such as system memory or other memory. In some cases, the software 710 may not be directly executable by the processor but may cause a computer (e.g., when compiled and executed) to perform functions described herein.

The transceiver 712 may communicate bi-directionally, via one or more antennas, wired, or wireless links. For example, the transceiver 712 may represent a wireless transceiver and may communicate bi-directionally with another wireless transceiver. The transceiver 712 may also include a modem to modulate the packets and provide the modulated packets to the antennas for transmission, and to demodulate packets received from the antennas.

The I/O controller 714 may manage input and output signals for the device 702. The I/O controller 714 may also manage peripherals not integrated into the device 702. In some examples, the I/O controller 714 may represent a physical connection or port to an external peripheral. In some examples, the I/O controller 714 may utilize an operating system such as iOS®, ANDROID®, MS-DOS®, MS-WINDOWS®, OS/2®, UNIX®, LINUX®, or another known operating system. In some examples, the I/O controller 714 may represent or interact with a modem, a keyboard, a mouse, a touchscreen, or a similar device. In some examples, the I/O controller 714 may be implemented as part of a processor. In some examples, a user may interact with the device 702 via the I/O controller 714 or via hardware components controlled by the I/O controller 714.

The device 702 may receive data from external devices, such as the UAV 306, the stationary device 318, and/or the UGV 406, discussed above with respect to FIGS. 3A through 4D. The data may include external sensor data, which may be received from the UAV 306 and/or the stationary device 318, and internal sensor data, which may be received from the UGV 406. The inspection component 704 may correlate position data in the internal sensor data with position data in the external sensor data. The inspection component 704 may identify or detect defects present on a rotor blade by analyzing the external sensor data and the internal sensor data.

The inspection component 704 may correlate positions of defects identified or detected in the external sensor data with positions in the internal sensor data and vice versa. The inspection component 704 may generate displays that include both the external sensor data (e.g., images of exterior surfaces of the rotor blade) and the internal sensor data (e.g., images of interior surfaces of the rotor blade corresponding to the images of the exterior surfaces of the rotor blade), which can be displayed on a display. The inspection component 704 may generate suggested corrective actions based on the external sensor data and the internal sensor data.

In some examples, the inspection component 704 may perform a risk level assessment, and associate risk levels with or assign risk levels to a rotor blade and any defects present thereon. The inspection component 704 may generate the suggested corrective actions based on the risk levels associated with or assigned to the rotor blade. The corrective actions can include monitoring the rotor blade, repairing the rotor blade, replacing the rotor blade, or altering control parameters of a wind turbine on which the rotor blade is installed in response to the risk level associated with or assigned to the rotor blade.

Although the present disclosure has been described in the context of performing inspections on rotor blades of wind turbines, the disclosed systems and methods can be used to perform inspections on any structures in which internal and external inspections can be combined synergistically. This can be particularly useful for structures formed from composite materials. Other applications for which the disclosed systems and methods can be used include inspecting pipes (e.g., over ground or underwater pipes and the like), aircraft wings, wind turbine towers, foundations, and any other applications in which inspections of internal and external surfaces are desired.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A method of inspecting a blade of a wind turbine, the method comprising:
    analyzing an exterior of the blade to produce external blade data;
    analyzing an interior of the blade to produce internal blade data, the analyzing the interior of the blade comprising detecting interior dimensions of the blade based on distances to interior surfaces of the blade detected by a distance sensor;
    correlating a first position in the internal blade data with a second position in the external blade data, wherein the first position is determined at least partially based on the detected interior dimensions of the blade; and
    displaying an image comprising the first position and the second position.

2. The method of claim 1, wherein:
    analyzing the exterior of the blade comprises imaging the exterior of the blade;
    analyzing the interior of the blade comprises imaging the interior of the blade; and
    displaying the image comprises displaying a first image of the interior of the blade comprising the first position and a second image of the exterior of the blade comprising the second position.

3. The method of claim 1, wherein:
    a first device analyzes the exterior of the blade;
    a second device analyzes the interior of the blade; and
    the first position is correlated with the second position by detecting a position of the second device relative to the blade.

4. The method of claim 1, further comprising identifying a defect on the exterior or the interior of the blade, wherein the first position and the second position correspond to a position of the defect relative to the blade.

5. The method of claim 1, further comprising:
    identifying a defect on the exterior or the interior of the blade; and
    assessing a risk level corresponding to the defect based on a combination of the external blade data and the internal blade data.

6. The method of claim 5, further comprising providing recommendations for at least one of monitoring the blade, repairing the blade, replacing the blade, or altering a control parameter of the wind turbine in response to the assessed risk level.

7. The method of claim 1, further comprising:
    stitching the external blade data together to form a panoramic view of the exterior of the blade; and
    stitching the internal blade data together to form a panoramic view of the interior of the blade.

8. The method of claim 1, wherein:
    a first device analyzes the interior of the blade, the first device comprising the distance sensor; and
    the first position is correlated with the second position by comparing detected interior dimensions of the blade with known dimensions of the blade.

9. A system for performing an inspection of a blade of a wind turbine, the system comprising:
    an external sensing device comprising a first sensor configured to analyze an exterior of the blade and produce an external data signal;
    an internal sensing device comprising a second sensor configured to analyze an interior of the blade and produce an internal data signal; and
    a display configured to display an image comprising:
        an exterior image of the blade generated from the external data signal, the exterior image comprising a first external position on the blade; and
        an interior image of the blade generated from the internal data signal, the interior image comprising a first internal position on the blade corresponding to the first external position, wherein the first internal position is determined based at least in part on interior dimensions of the blade detected by the second sensor based on distances to surfaces of the blade.

10. The system of claim 9, wherein the external sensing device comprises a stationary sensor device or an unmanned aerial vehicle.

11. The system of claim 9, wherein the internal sensing device comprises an unmanned ground vehicle comprising wheels or tracks.

12. The system of claim 9, wherein the internal sensing device comprises a cable configured to spool and measure a distance traveled by the internal sensing device.

13. The system of claim 9, wherein the internal sensing device comprises at least one of an infrared sensor, a LiDAR sensor, an acoustic sensor, or an optical sensor.

14. The system of claim 9, wherein each of the exterior image and the interior image comprise multiple images stitched together.

15. A non-transitory computer-readable medium storing code for assessment of a wind turbine blade, the code comprising instructions executable by a processor to:
   receive a first data stream corresponding to an external inspection of the wind turbine blade;
   receive a second data stream corresponding to an internal inspection of the wind turbine blade;
   determine a deflection or curvature of the wind turbine blade based on at least one of the first data stream or the second data stream;
   detect a defect on the wind turbine blade based on the first data stream or the second data stream; and
   identify a first position in the first data stream corresponding to a position of the defect and a second position in the second data stream corresponding to the position of the defect, the second position being at least partially based on the determined deflection or curvature of the wind turbine blade.

16. The non-transitory computer-readable medium of claim 15, wherein the code further comprises instructions executable by the processor to display an image comprising the first position and the second position.

17. The non-transitory computer-readable medium of claim 15, wherein the code further comprises instructions executable by the processor to assign a risk level to the wind turbine blade based on the defect detected on the wind turbine blade.

18. The non-transitory computer-readable medium of claim 15, wherein the code further comprises instructions executable by the processor to provide recommendations for corrective actions to be performed on the wind turbine blade based on the defect detected on the wind turbine blade.

19. The non-transitory computer-readable medium of claim 15, wherein the first data stream comprises a plurality of images of an exterior of the wind turbine blade stitched together in a plurality of views.

20. The non-transitory computer-readable medium of claim 15, wherein the second data stream comprises a plurality of images of a plurality of interior cavities of the wind turbine blade stitched together in a plurality of views.

* * * * *